United States Patent
Koenecke et al.

(10) Patent No.: US 10,424,916 B2
(45) Date of Patent: Sep. 24, 2019

(54) DOWNHOLE COMPONENT COMMUNICATION AND POWER MANAGEMENT

(71) Applicants: Andre Koenecke, Nienhagen (DE); Matthias Gatzen, Isernhagen (DE); Wido Kunde, Eschede (DE); Ole-Hendrik Ohlendorf, Hannover (DE); Frank Wiese, Lower Saxony (DE); Michael Szczepanski, Celle (DE)

(72) Inventors: Andre Koenecke, Nienhagen (DE); Matthias Gatzen, Isernhagen (DE); Wido Kunde, Eschede (DE); Ole-Hendrik Ohlendorf, Hannover (DE); Frank Wiese, Lower Saxony (DE); Michael Szczepanski, Celle (DE)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 241 days.

(21) Appl. No.: 15/152,999

(22) Filed: May 12, 2016

(65) Prior Publication Data

US 2017/0331280 A1   Nov. 16, 2017

(51) Int. Cl.
*E21B 41/00* (2006.01)
*H02H 7/20* (2006.01)
(Continued)

(52) U.S. Cl.
CPC ............ *H02H 7/20* (2013.01); *E21B 41/00* (2013.01); *E21B 47/00* (2013.01); *H02H 3/08* (2013.01);
(Continued)

(58) Field of Classification Search
CPC .. H02H 7/20; H02H 3/08; H02H 3/20; H02H 7/26; H02H 3/10; E21B 41/00;
(Continued)

(56) References Cited

U.S. PATENT DOCUMENTS

| 4,523,194 A | 6/1985 | Hyde |
| 6,449,544 B1 | 9/2002 | Nitschke et al. |

(Continued)

FOREIGN PATENT DOCUMENTS

| WO | 2009042494 A2 | 4/2009 | |
| WO | WO-2015115904 A1 * | 8/2015 | ............ E21B 23/14 |
| WO | 2015142988 A1 | 9/2015 | |

OTHER PUBLICATIONS

Watson, et al.; "High-Temperature Electronics Pose Design and Reliability Challenges"; Analog Dialogue 46-04; Apr. 2012; Retrieved from the internet; URL:http://www.analog.com/en/analog-dialogue/articles/high-temperature-electronic-pose-design-challenges.html; 7 pages.

(Continued)

*Primary Examiner* — Brad Harcourt
(74) *Attorney, Agent, or Firm* — Cantor Colburn LLP (57) ABSTRACT

A power control device includes a communication device configured to be disposed in a borehole and configured to couple electrical power from a power source to a downhole component from a conductor disposed along a borehole string, a circuit breaker system including a first circuit breaker disposed at a connection between the conductor and the downhole component and configured to be closed to connect the downhole component to the conductor, and a controller configured to monitor at least one of a current level and a voltage level at the connection and at the conductor. The controller is configured to control the circuit breaker system and autonomously perform opening the first circuit breaker in response to detecting a deviation in the at least one of the current levels and voltage levels at the connection, to isolate the downhole component from the conductor and the power source.

30 Claims, 6 Drawing Sheets

(51) Int. Cl.
*E21B 47/00* (2012.01)
*H02H 3/08* (2006.01)
*H02H 3/10* (2006.01)
*H02H 3/20* (2006.01)
*H02H 7/26* (2006.01)
*E21B 47/06* (2012.01)
*E21B 47/12* (2012.01)
*E21B 49/02* (2006.01)
*E21B 49/08* (2006.01)

(52) U.S. Cl.
CPC ............... *H02H 3/10* (2013.01); *H02H 3/20* (2013.01); *H02H 7/26* (2013.01); *E21B 47/06* (2013.01); *E21B 47/12* (2013.01); *E21B 49/02* (2013.01); *E21B 49/081* (2013.01)

(58) Field of Classification Search
CPC ........ E21B 47/00; E21B 49/081; E21B 47/12; E21B 47/06; E21B 49/02
See application file for complete search history.

(56) References Cited

U.S. PATENT DOCUMENTS

| | | |
|---|---|---|
| 7,275,597 B2 | 10/2007 | Hall et al. |
| 8,264,369 B2 | 9/2012 | Hall et al. |
| 8,793,114 B2 | 7/2014 | Shafer et al. |
| 9,068,442 B2 | 6/2015 | Golla et al. |
| 2004/0108114 A1 | 6/2004 | Lerche et al. |
| 2005/0264271 A1 | 12/2005 | Lam et al. |
| 2009/0146838 A1 | 6/2009 | Katz |
| 2009/0153354 A1 | 6/2009 | Daussin et al. |
| 2009/0288838 A1* | 11/2009 | Richards ............... E21B 34/063 166/374 |
| 2010/0039286 A1 | 2/2010 | Robbins |
| 2010/0073189 A1 | 3/2010 | Mandal et al. |
| 2010/0147510 A1 | 6/2010 | Kwok et al. |
| 2011/0139445 A1 | 6/2011 | Fripp et al. |
| 2011/0153217 A1 | 6/2011 | Rodney |
| 2011/0192599 A1 | 8/2011 | Surjaatmadja et al. |
| 2012/0013893 A1 | 1/2012 | Maida et al. |
| 2012/0043069 A1 | 2/2012 | Maranuk et al. |
| 2012/0146415 A1 | 6/2012 | Simsek et al. |
| 2012/0279711 A1 | 11/2012 | Collins et al. |
| 2013/0043048 A1 | 2/2013 | Joseph |
| 2013/0319102 A1 | 12/2013 | Ringgenberg et al. |
| 2014/0110106 A1 | 4/2014 | Fripp et al. |
| 2014/0085098 A1 | 5/2014 | Stolpman et al. |
| 2014/0151019 A1 | 6/2014 | Gano |
| 2014/0166311 A1 | 6/2014 | Richards et al. |

OTHER PUBLICATIONS

International Search Report and the Written Opinion of the International Searching Authority; PCT/US2017/031528; Korean Intellectual Property Office; dated Jul. 25, 2017; 14 pages.

* cited by examiner

DOWNHOLE COMPONENT COMMUNICATION AND POWER MANAGEMENT

BACKGROUND

Exploration and production of hydrocarbons require a number of diverse activities from various engineering fields to be performed in a borehole penetrating an earth formation. Typically, exploration involves surveying and performing measurements known as logging using a survey or logging tool. Production generally involves activities such as drilling, installing permanent installations, casing perforation, hydraulic fracturing, formation evaluation, well integrity surveys, well stimulation, production logging, pressure pumping and cement evaluation. Some of the different tools used in various operations require electrical power supply, which may be supplied from a surface location (e.g., via a conductor disposed in a wireline or in a borehole string) or a downhole location (e.g., via a generator or battery disposed downhole).

SUMMARY

An embodiment of a power control device for controlling power supply to a downhole component includes a communication device configured to be disposed in a borehole in an earth formation and configured to couple electrical power from a power source to a downhole component from a conductor disposed along a borehole string, a circuit breaker system including a first circuit breaker disposed at a connection between the conductor and the downhole component and configured to be closed to connect the downhole component to the conductor, and a controller configured to be disposed in the borehole, the controller configured to monitor at least one of a current level and a voltage level at the connection. The controller is configured to control the circuit breaker system and autonomously perform opening the first circuit breaker in response to detecting a deviation in the at least one of the current levels and voltage levels at the connection, to isolate the downhole component from the conductor and the power source.

An embodiment of a method of controlling power supply to a downhole component includes disposing a power control device in a borehole in an earth formation, the power control device including a communication device configured to couple electrical power to a downhole component from a conductor disposed along a borehole string and connected to a power source, the power control device including a circuit breaker system and a controller configured to control the circuit breaker system, the circuit breaker system including a first circuit breaker disposed at a connection between the conductor and the downhole component and configured to be closed to connect the downhole component to the conductor. The method also includes receiving electrical power via the conductor to activate the communication device and the controller, monitoring, by the power control device, at least one of a current level and a voltage level at the connection, and opening the first circuit breaker in response to detecting a deviation in the at least one of the current levels and voltage levels at the connection, to isolate the downhole component from the conductor and the power source.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method presented herein by way of exemplification and not limitation with reference to the figures.

Systems, apparatus and methods are provided herein for managing electrical power supplied to downhole components. An embodiment of a power control device includes a communication device for connecting the downhole component to a downhole conductor such as a borehole string bus, and a circuit breaker controller. The circuit breaker controller is connected to a circuit breaker system that allows the controller to autonomously monitor and control electrical connection of the downhole component to the bus and/or control segments of the bus. In one embodiment, the circuit breaker system is a three-breaker system that includes a tool breaker disposed at a connection between a tool or other component and the bus, and one or more breakers disposed at the bus for controlling whether a segment of the bus is connected to other segments and/or a power source.

Embodiments described herein may perform a number of functions, such as communication to and between individual nodes/tools, sequence detection of installed tools or other downhole components, power and communication error detection and diagnostics, power management and others. For example, the power control device can autonomously establish the bus connections between downhole tools and supports the detection of the physical setup of a borehole string. In addition, the power control device can autonomously control the circuit breakers to isolate electrical shorts and other failures. As described herein, autonomous actions are actions that are performed by a device in the absence of an instruction or command from another entity. Such autonomous actions may be performed in response to inputs such as current measurements, voltage measurements, or any other relevant measurements or data acquired by sensors controlled by the device or measurements or data received from another device or separate sensor.

In one embodiment, the power control device is part of a power control system that includes a plurality of power control devices, each connected to a respective downhole component. The power control system can control power supply, e.g., by allocating power to an entire downhole component assembly, e.g., a plurality of tools arrayed along a borehole string and/or bottomhole assembly (BHA), or allocating power to selected components. In one embodiment, some functions of the power control system are performed by a master controller. One or more of the power control devices can be designated as the master controller, and this designation may be changed as desired. Power management functions may be controlled by the master controller, as well as diagnostic functions that allow detection of electrical failures in electrical connections and in component electronics.

Figure 1:
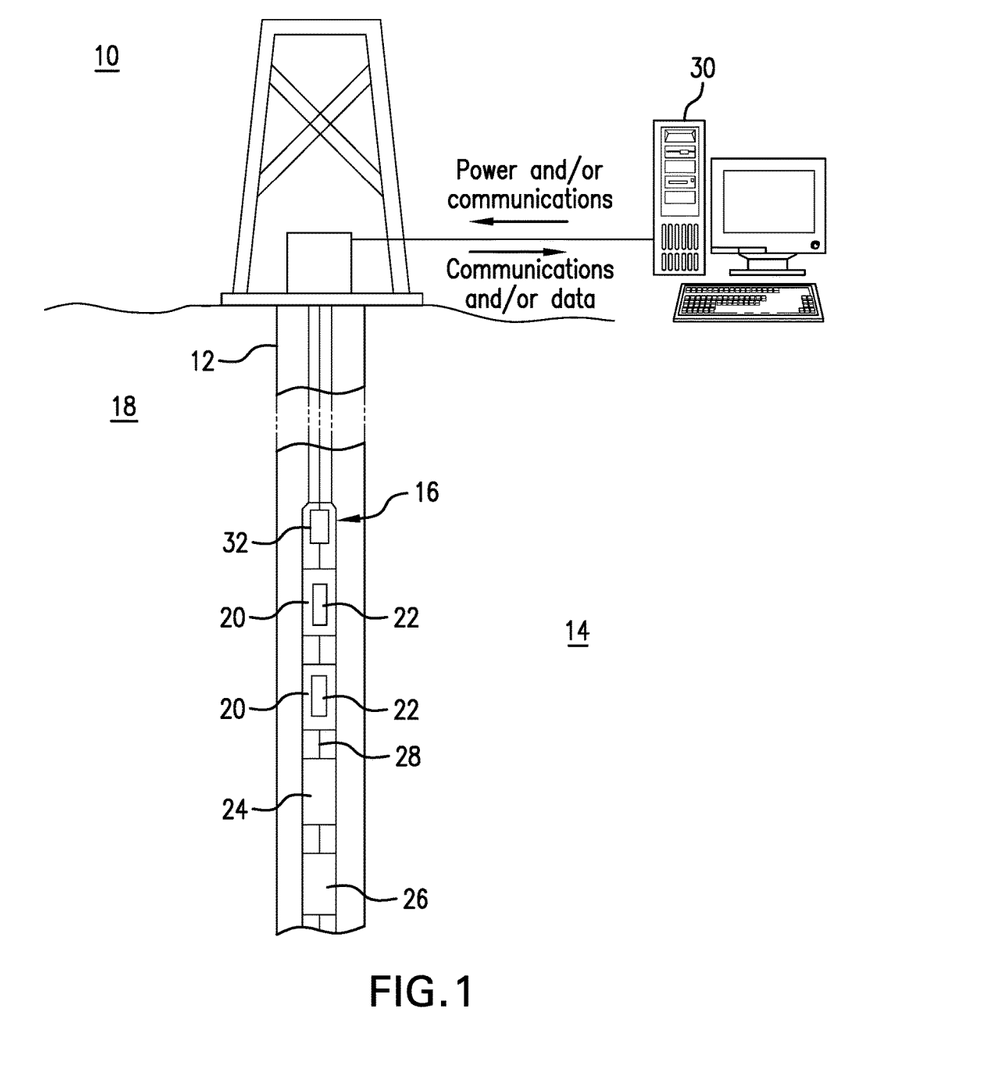
FIG. 1 illustrates a cross-sectional view of an exemplary embodiment of a system including a plurality of downhole tools configured to be disposed in a borehole in an earth formation.

FIG. 1 illustrates an embodiment of a system 10 for performing energy industry operations such as drilling a borehole 12 in an earth formation 14, formation measurement and/or evaluation, hydrocarbon production, completion and/or stimulation. The system 10 includes a carrier such as a borehole string or tool string 16 configured to deploy one or more downhole components in the borehole 12. The borehole string may be connected to the surface via any suitable carrier, such as a drill string or a production string. A "carrier" as described herein means any device, device component, combination of devices, media and/or member that may be used to convey, house, support or otherwise facilitate the use of another device, device component, combination of devices, media and/or member. Exemplary non-limiting carriers include coiled tubing, drill strings of the coiled tube type, of the jointed pipe type and any combination or portion thereof. Other carrier examples include wirelines, wireline sondes, slickline sondes, drop shots, downhole subs, bottom-hole assemblies, and drill strings.

Any number of downhole tools or components may be deployed in the borehole. For example, the tool string 16 includes an array of downhole components such as one or more logging tools 20. Each logging tool 20 includes a sensing device 22 configured to perform downhole measurements such as temperature, pressure and/or flow rate. The sensing device may be configured to emit energy (e.g., acoustic, seismic, electromagnetic, neutron radiation, etc.) into the formation 14 and receive signals due to interaction with the formation 14. Other examples of downhole components include a formation test tool 24 for extracting a sample of the formation and/or formation fluid via, for example, a fluid sample port or a coring tool. Further examples include a stimulation tool 26 configured to perform or facilitate performing a stimulation operation such as a hydraulic fracturing operation, and a flow control device for injecting fluid into the formation 14 and/or receiving fluid from the formation 14. Other types of downhole tools are also contemplated, such as steering devices or systems, logging while drilling (LWD) tools, measurement while drilling (MWD) tools, and directional sensors. It is noted that the use of the term "tool" is intended to encompass any device or component that can be deployed downhole.

One or more of the downhole components are configured to communicate with the surface and/or to other component(s) by a communication system. Examples of such communication systems include mud pulse telemetry (positive or negative), electromagnetic telemetry, ultrasonic sound, electrical conductor (e.g., a wireline, wired pipe, cable or wire, optical fiber and others). In one embodiment, the downhole components are connected to one another by a bus or other conductor 28. The conductor 28 may include a single conductor that extends along the borehole string 16 to provide power to multiple tools or components arrayed along the string.

In one embodiment, the downhole components (e.g., tools) are connected by electrical conductors to each other, which provide electrical power to the conductors and may also provide communication to each other. At least one of the components provides electrical power (e.g., by generating electrical power from mud flow or by a battery disposed at or connected to the component). One of the components (e.g., a master as described further below) can send signals via, e.g., mud pulse telemetry (uplink) to the surface. One of the components can receive signals from the surface via, e.g., mud pulse telemetry (downlink).

In one embodiment, the downhole components are connected by conductors to each other, which provide electrical power and may provide communication to each other. At least one component is internally connected to a data processing unit and power generator which is outside the borehole string.

In one embodiment, the system 10 includes a surface processing unit 30, which may provide or facilitate power transmission to the downhole components, and may also send and receive data and communications to and from the downhole components. A subsurface processing unit 32 may also be disposed in the borehole 12 and connected to one or more of the downhole components. The surface and/or subsurface processing unit includes at least one processor and suitable electronics to transmit power to the tools, and optionally to transmit signals and/or data. In the example shown in FIG. 1, the surface and/or subsurface processing unit is connected in communication with each of the downhole components or a subset of the components. The downhole components may be connected in series by suitable links (e.g., fiber optic cables, electrical conductors or both), or can be connected as part of any suitable network configuration.

One or more downhole components, such as one or more of the tools shown in FIG. 1, include or are connected to a power control device configured to control the supply of electrical power to the downhole component. In one embodiment, a plurality of downhole components are each connected to a respective power control device. Each power control device is connected to the conductor 28 and can autonomously connect and disconnect its respective downhole component, and may also autonomously connect or disconnect segments of the conductor 28 from a power source and/or other segments of the conductor 28.

The power control device includes a processor or processing device that is capable of controlling power supply autonomously and/or in response to instructions from a master controller. The power supply may be controlled in response to detection of various conditions, such as a failure within the component or component electronics, failure between components or between a component and the surface, instructions to initialize the component and/or the addition of a new component. The power control device supports functions including plug and play, power management, tool identification, and/or failure diagnostics and failure management.

Figure 2:
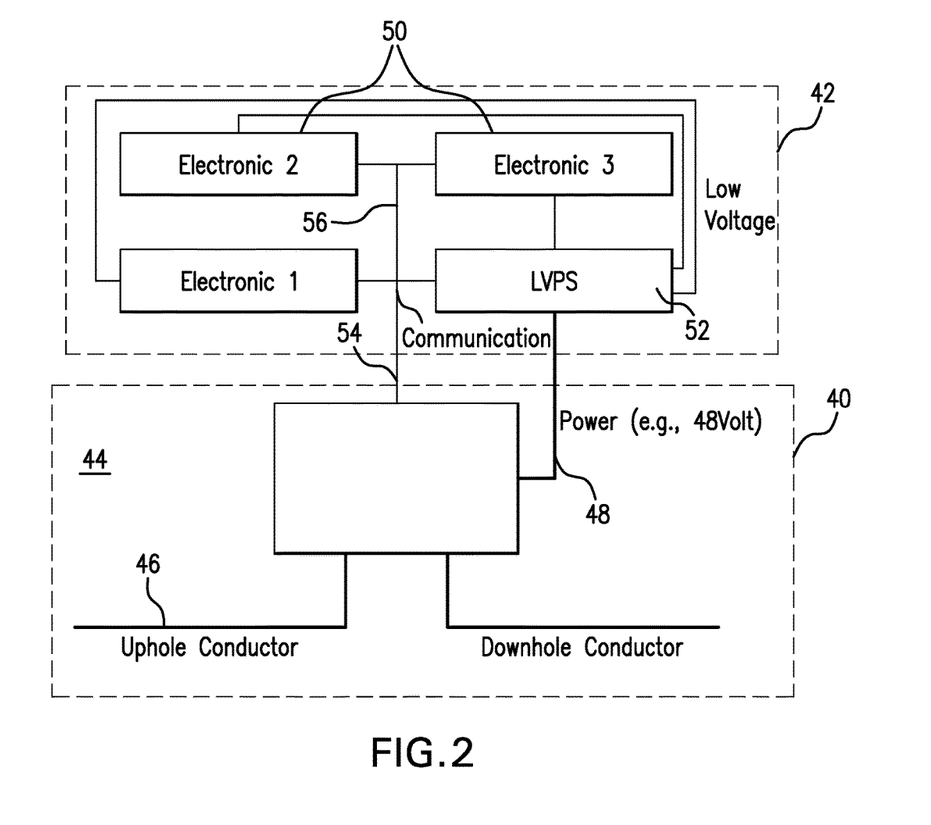
FIG. 2 depicts an embodiment of a power control and communication device and/or system connected to a downhole component

FIG. 2 illustrates an embodiment of a power control device 40 that is connected to or incorporated into a downhole component (referred to in this embodiment as a tool 42). The tool 42 may be disposed in any suitable carrier or energy industry system, such as the system 10. For example, the tool 42 is one of the downhole tools of FIG. 1, e.g., tool 20, 24 or 26.

In this embodiment, the power control device 40 is incorporated with the tool 42 (or as part of a sub, drill pipe segment or other tool carrier) but may be a separate unit. The power control device 40 includes a processing and control unit 44 that provides a connection to a bus 46 or other conductor at a connection point between the bus 46 and the tool 42. In one embodiment, the power control device splits the bus 46 into two segments and creates a stub power line 48 that connects the control unit 44 to tool electronics 50. For example, the stub power line 48 connects to a low voltage power supply (LVPS) 52 located within or connected to the tool 42. The power control device 40 may also include a communication line 54 connected to the tool electronics 50 via, e.g., an internal bus 56.

In one embodiment, the power control device 40 includes a circuit breaker system that includes a number of circuit breakers that are controlled by the control unit 44 (e.g., by a circuit breaker controller in the unit). As the circuit breaker system is combined with the control unit 44, it is an active part of power management functions (e.g., enabling and/or disabling tool electronics) as well as diagnostic functions (e.g., tool electronic failure and/or conductor or joint failure detection) and communication.

Figure 3:
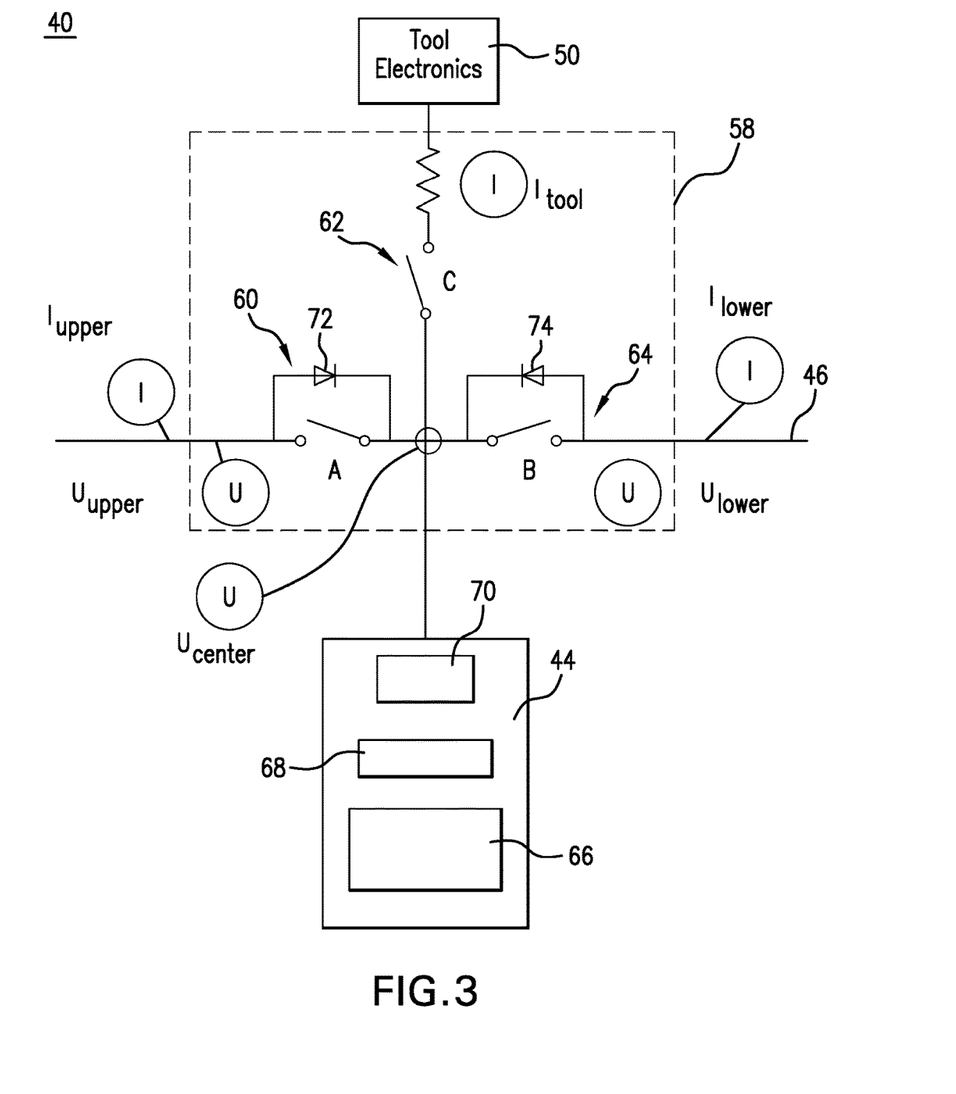
FIG. 3 depicts an embodiment of a power control device including a circuit breaker system.

FIG. 3 shows an example of the power control device 40 that includes a two-way or three-way breaker system 58 connected to the controller 44. In this example, the breaker system 58 includes a first breaker 62 (also referred to as a central breaker, component breaker or tool breaker) disposed between the bus 46 and the tool electronics 50. The breaker system 58 may also include a second breaker 60 coupled to the bus 46. The breaker system 58 may further include a third breaker 64 coupled to the bus on an opposite side of the tool. In the example shown in FIG. 3, the breaker system includes all of the breakers 60, 62 and 64, but is not so limited. For example, the breaker system 58 may include only the first breaker 62, or include the first breaker 62 and one of the second breaker 60 and the third breaker 64.

Although the power control device 40 shown in FIG. 3 includes a single tool (represented by tool electronics 50) connected to the control unit 44, the power control device 40 is not so limited. The control unit 44 may be connected to multiple tools or other downhole components, and configured to control power supply to the multiple tools individually or collectively. For example, the connection may include multiple stub lines or conductors connected to the control unit 44, where each stub line or conductor is connected to a respective tool. Each stub line or conductor in this example may have a respective circuit breaker operable by the control unit 44, to allow the control unit to monitor and connect or disconnect each tool individually. The breakers 60 and 64 are operable to connect or disconnect the tool from the bus 46, and connect or disconnect segments of the bus 46 on either side of the tool. For example, if a power source is connected to the tool from the side corresponding to the breaker 60, the breaker 60 is considered an input breaker and the breaker 64 is considered the output breaker. Likewise, if a power source is connected from the opposite side, the breaker 64 is the input breaker and the breaker 60 is the output breaker.

The control unit 44 includes various processing units for performing functions such as communication, supply of power to the tool electronics 50, monitoring and breaker control. In one embodiment, the control unit 44 includes a circuit breaker controller 66 with analog/digital (A/D) inputs for current and voltage measurement. The controller 66 makes circuit breaker trip decisions for the three breakers based on programmable conditions as well as hard-coded events. A communication device 68 such as a modem is included to enable communications with a master controller and/or other power control devices.

The control unit 44 is connected to the bus 46, e.g., at a central connection point between breakers 60 and 64. A connection between the control unit and the tool electronics may include portions of the conductor 46, the central connection point and/or a stub power line (or multiple stub power lines) or other conductor that connects the conductor 46 to the tool electronics. In one embodiment, the control unit 44 is powered by the bus 46, and includes suitable components such as an integrated LVPS 70. For example, the breaker 60 includes a circuit component such as a diode 72 for powering the control unit 44 when the breaker 60 is open and power is supplied from the breaker 60 side (also referred to as an upper side in this example). The breaker 64 also includes a circuit component such as a diode 74 for powering the control unit 44 when the breaker 64 is open and power is supplied from the breaker 60 side (also referred to as a lower side in this example). An upper location may not necessarily be physically above a lower location, e.g., in a horizontal section of a borehole. The breakers 60 and 64 are thus configured so that the conductor 46 can be tested and power supplied on either side of the tool. The three-way breaker system embodiment may be utilized for systems having multiple tools, e.g., tools arrayed longitudinally along a borehole string.

The control unit 44 receives input based on a number of current and voltage measurements, including measurements of current received by the tool, and measurements of voltage and/or currents in the bus 46. In one embodiment, the control unit 44 receives measurement values including a measurement of the tool electronics current ($I_{tool}$), a measurement of the bus current above the connection ($L_{upper}$), a measurement of the bus current below the connection ($L_{lower}$), a measurement of the bus voltage above the connection ($U_{upper}$), a measurement of the bus voltage below the connection ($U_{lower}$), a measurement of voltage at the central connection point ($U_{center}$), or any combination of the measurements. The control unit 44 may receive measurement The control unit 44 controls operation of the breakers based on the measurements. For example, the control unit 44 can open or close any of the breakers individually, e.g., to protect the tool electronics, control initialization and/or allow additional components to be added.

For example, in the case of multiple tools (each with a respective power control device) arrayed along a borehole string, the control unit 44 operates to facilitate an initialization or power up procedure or sequence (also referred to as a startup phase). Referring again to FIG. 3, when powered from the upper side, the breaker 60 is bypassed by the diode 72 (e.g., a MOSFET body diode), thereby powering the control unit 44. To protect the diode 72 from high currents and lower the resistance, the control unit 44 closes the breaker 60. After a selected period of time, another tool connected below the tool is powered by closing the lower breaker 64. This waiting time allows for detection of the startup order of the tools. The tool electronics 50 are powered by closing the breaker 62.

The three breakers can be controlled separately, and thus the breaker 62 is available for detecting and managing shorts or malfunctions within the tool electronics, as well as power management features. The breakers 60 and 64 may be used for detecting and handling failures, such as tool joint failures and wiring failures resulting in a short that is detected in startup phase. In one embodiment, in order to provide monitoring and initialization functionality, the control unit 44 (e.g., including the breaker controller and modem) is provided with some basic information about its tool, such as the norm current consumption for the tool breaker 62 trip threshold and the tool category for addressing in the initialization phase.

The breakers 60 and 64 are designed to operate autonomously. For example, during startup the closing of the breakers 60 and 64 is not controlled by a central master, but the local control unit 44. If control unit 44 recognizes a tool failure or joint failure, it makes the trip-decision based on, e.g., pre-programmed thresholds. Diagnostic data for tool and joint analysis may be transmitted to a master controller.

One advantage of autonomous behavior of the breakers 60 and 64 over command oriented switching is that the power control device can supply power to segments of the bus independent of a central power management coordinator. For example, if communication between a power management master and a downhole tool fails, the autonomous power control unit 44 can still close the connections to other tools connected to the bus.

With the autonomous breakers, the common bus or other conductor connecting the downhole tools is divided into segments that can be tested for electrical shorts at startup and during operation. In case of a short, the power control unit 44 does not connect its respective tool and/or segment, thus allowing the remaining tools to operate as expected. In case of an electrical failure during operation, the bus connections can be re-established to locate the failing connector and again isolate the connection.

In one embodiment, the power control device is connected to a master controller configured to communicate with at least the power control device or devices. The master controller is configured to send commands to the power control devices to control when each tool is powered. Each power control device can connect its respective tool in response to the command, and can reject the command if a problem is detected. In one embodiment, any of the power control devices, if suitably equipped, may be designated as and operate as the master. The operation of the power control devices and the master controller is further described below in conjunction with a number of examples.

It is noted that the downhole components, the power control devices and the master controller may communicate via any suitable technique or configuration. For example, communication may be performed through the bus 46 using a powerline communication (PLC) protocol. In other examples, communication may be accomplished using means other than the bus 46, e.g., using a separate electrical or optical conductor or mud pulse telemetry. For example, communication between the surface and one or more power control devices 40 and/or tools is accomplished by mud pulse telemetry or other suitable telemetry techniques.

Figure 4:
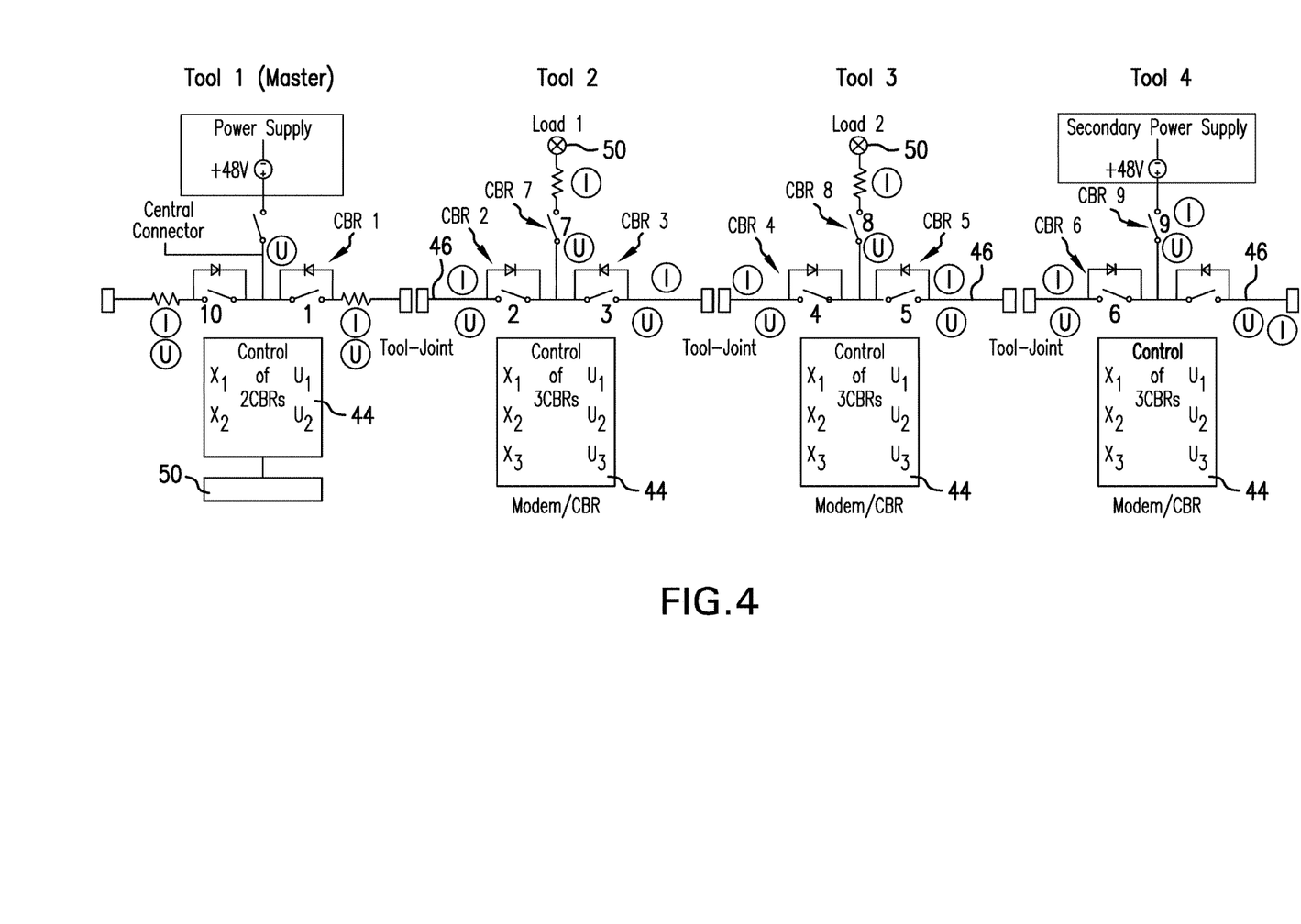
FIG. 4 depicts an example of a power control system coupled to a section of a borehole string.

FIG. 4 illustrates an example of a portion of an energy industry system that includes multiple tools arrayed along a borehole string. Each tool (represented by a load corresponding to the tool electronics 50) is connected to a respective power control device including a control unit 44. One of the tools is configured as or designated as a master controller (referred to as a master). In this embodiment, the master controller is connected to a primary power source, which may be at a surface or downhole location. The master controller and power control devices are collectively referred to as a power control system, and each control device, each tool, or each tool/power control device combination may be considered nodes in the system. In this example, the tools are labeled Tool 1, Tool 2, Tool 3 and Tool 4. Tool 1 is designated the master, although another tool can be designated as the master if desired. FIG. 4 also shows an example of a secondary power source such as a downhole battery unit, which is connected to or incorporated in Tool 4. Various circuit breakers (also referred to as CBRs) have been labeled CBRs 1-9 for discussion purposes in describing embodiments of methods that can be performed by individual power control devices and/or the master.

In one embodiment, the power control system is configured to perform an initialization, power-up or startup procedure. During a startup phase, the circuit breakers in each power control device are closed one after another, and the physical order of the connected tools are detected by the master controller. The detected order of the tools may be used to verify against a pre-configured setup and/or to automatically adapt to changing setups (e.g. for telemetry).

Figure 5:
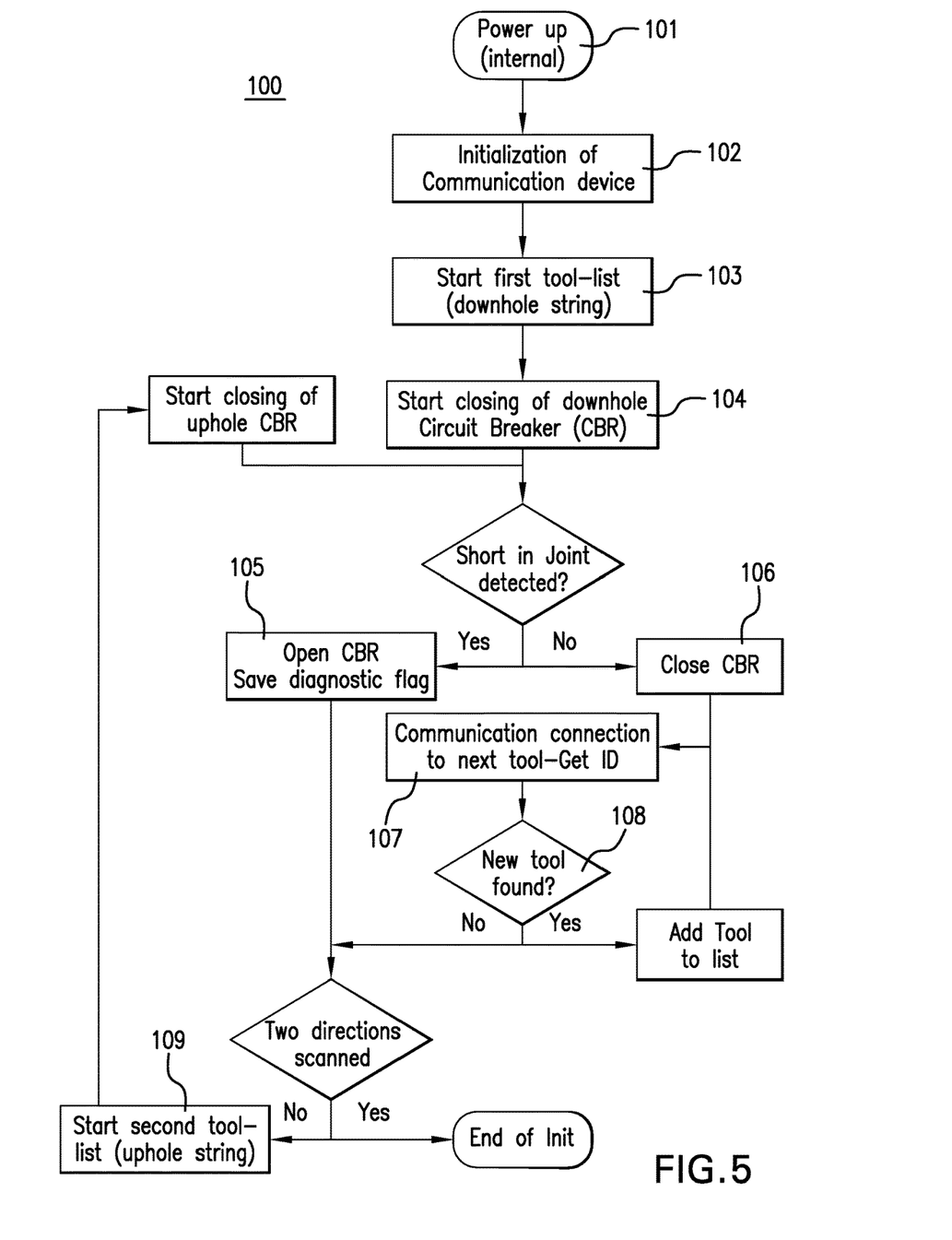
FIG. 5 is a flow chart depicting an embodiment of a method of initializing one or more downhole tools.

FIG. 5 is a flow chart that illustrates an embodiment of a method 100 of performing an initialization procedure using a power control system such as the system shown in FIG. 4. In this embodiment, the method is performed by a master controller in conjunction with individual power control devices connected to respective downhole components, such as Tools 1-4 of FIG. 4. The method 100 includes one or more stages 101-109. In one embodiment, the method 100 includes the execution of all of the stages 101-109 in the order described. However, certain stages may be omitted, stages may be added, or the order of the stages changed.

In the initialization phase, the physical setup of the downhole tools is evaluated. This evaluation includes creating a physical tools list by the master controller, which includes the order and capabilities of the connected tools. This phase includes successively powering sections of the bus and successively powering the tools, potentially with a delay between each section to allow individual power control devices to initialize and to allow for identifying each newly connected tool (if any).

At stage 101, a carrier such as a borehole string is disposed in a borehole. The borehole string includes a plurality of downhole tools and a master controller coupled to a power source. The master controller, located in or at Tool 1, powers up to commence an initialization phase.

At stage 102, the master controller initializes its communication device or components, e.g., waits for its communication components (e.g., a powerline modem) to be ready for communication.

At stage 103, the master controller receives, generates and/or accesses a list of tools and their respective order or locations on the string. The list may include a description of logical tools, generated to describe the order of the tools in the string.

At stage 104, the master controller closes CBR 1 to test the connection between Tool 1 and Tool 2 for a short (a soft close). The inrush current is expected to be very low, as only the controller of Tool 2 is powered via the diode in CBR 2 at this moment. Open circuits are detected as no load is present on subsequent sections of the bus.

At stage 105, if a short is detected, CBR 1 is opened and diagnostic information such as a diagnostic flag is saved. At stage 106, if the connection between Tool 1 and Tool 2 is good and no short is detected, CBR 1 is fully closed and remains closed to supply power to subsequent tools.

The master controller then waits for communications from subsequent tools (stage 107), and adds any new tools to the list (stage 108). Initialization is complete once all tools in the list have been accounted for and no new tools are found after a selected time.

At stage 109, if there are tools uphole of the master controller, a second tool list is accessed. An uphole circuit breaker (CBR 10) is soft closed and stages 104-108 are repeated for the uphole tools.

Upon receiving power from the bus, each power control device commences a power-up or initialization procedure that includes detecting voltage levels to determine whether the electrical connection from the master or an adjacent tool is sound. If the power control devices are connected in series, then each device is powered successively after the immediately preceding device is powered as closes its downstream breaker. For example, after the master closes the CBR 1, Tool 2 is powered via the diode in CBR 2. Tool 2 measures the voltage levels $U_{left}$ and $U_{right}$ and $U_{center}$ to check for the incoming direction of the power source. After Tool 2 identifies the power supply (e.g., a 48 Volt (48V) supply) on the input side, it closes the input breaker CBR 2 to lower diode power by enabling the CBR. Upon confirming that there are no breaks, shorts or other problems with the electrical connection, Tool 2 closes output breaker CBR 3 to supply power to the next tool (Tool 3 in this example). Tool 2 is then configured to close CBR 7 to activate Tool 2 based on, e.g., a command from the master. Tool 3 is then powered via a diode in CBR 4 and performs a similar procedure as that performed by Tool 2.

Depending on the startup time of the controller connected to a tool and the time required for voltage measurement, additional waiting time may be added to delay the startup of subsequent controllers (e.g., components such as powerline modems). For example, a delay of one second between the power-up of successive tools is recommended to make sure that identification of the order of tools in the borehole string is possible.

Communication may then be established between the master and the controllers, via command or automatically. In one embodiment, establishing communication requires that the master and the controllers be online, so there is a delay based on the amount of time required for all controllers to come online. For example, for controllers having a modem, it may take about four seconds per modem to come online, so there will be a delay in the initialization phase of n*4 seconds, where n is the number of controllers (including the master).

In one embodiment, after communication is established, the master verifies the existence and order of tools in the borehole string. For example, the master inspects a list, table or other data structure stored in memory. All tools and their logical addresses are verified against the data gathered in a pre-configuration phase (performed via surface equipment). If the verification fails (e.g., a tool is missing or exchanged, or a new setup has been installed), the master may start a telemetry update routine, to cope with the changed tool-situation.

Upon establishment of communication, the master can send messages or commands to activate individual tools. For example, the master (at Tool 1) can send commands to the activate Tool 2, Tool 3 and/or Tool 4 via a respective controller by closing CBR 7, 8 and/or 9 respectively.

If there is a short or other electrical malfunction within the tool electronics, the respective circuit breaker controller opens its stub breaker or tool breaker to isolate the problem. A message may be sent to the power management controller and diagnostic system to mark the tool as erroneous.

The master can verify or establish the order of tools and associated power control devices in a variety of ways. Aspects of the following are described in conjunction with the borehole string of FIG. 4 for illustrative purposes, but are not so limited.

In one embodiment, the master determines the order of each tool based on the power consumption of each tool. The master controller may determine an order of a downhole component relative to other downhole components along a borehole string based on a comparison of a measured input and/or output current to a known current consumption of at least one of the downhole component and the power control device.

For example, each power control device (e.g., controller connected to Tool 2, where the input side is the uphole side) is configured to measure the input current (at the input side) and compare the measured input current to an expected, known or normal current consumption of the power control device. The quotient of measured input current divided by the known current consumption is considered to be equivalent to the relative string position counted from the end (i.e., downhole or bottomhole end) of the borehole string. For example, the quotient calculated for Tool 2 is three, indicating that Tool 2 is the third tool in the string.

In another example, each power control device is configured to measure the output current (at the output side) and calculate the quotient of measured output current divided by the known current consumption. This quotient, increased by one, is equivalent to the relative string position counted from the end of the borehole string. Each power control unit is configured to send a message containing the calculated relative string position (based on input and/or output measurement) to the master controller (e.g., Tool 1), allowing the master controller to determine the order of downhole components.

In another example, each power control device is configured to measure at least one of the input or output conductor currents and, after the master issues a command to increase the power consumption, may add a predefined load to the common bus or conductor. The predefined load may be the same for each power control device, or may be different for each individual power control device or tool. The master is configured to issue a power-increase command to the power control units one after another. The power control devices connected to the bus measure at least one of the conductor input or output current and compare the measured current to previous measurements. The power control devices are configured to send a message to the master after detecting an increased conductor input or output current, or after detecting a stable conductor input or output current level. The master is configured to determine the order of downhole components by evaluating the messages from the power control devices.

Figure 6:
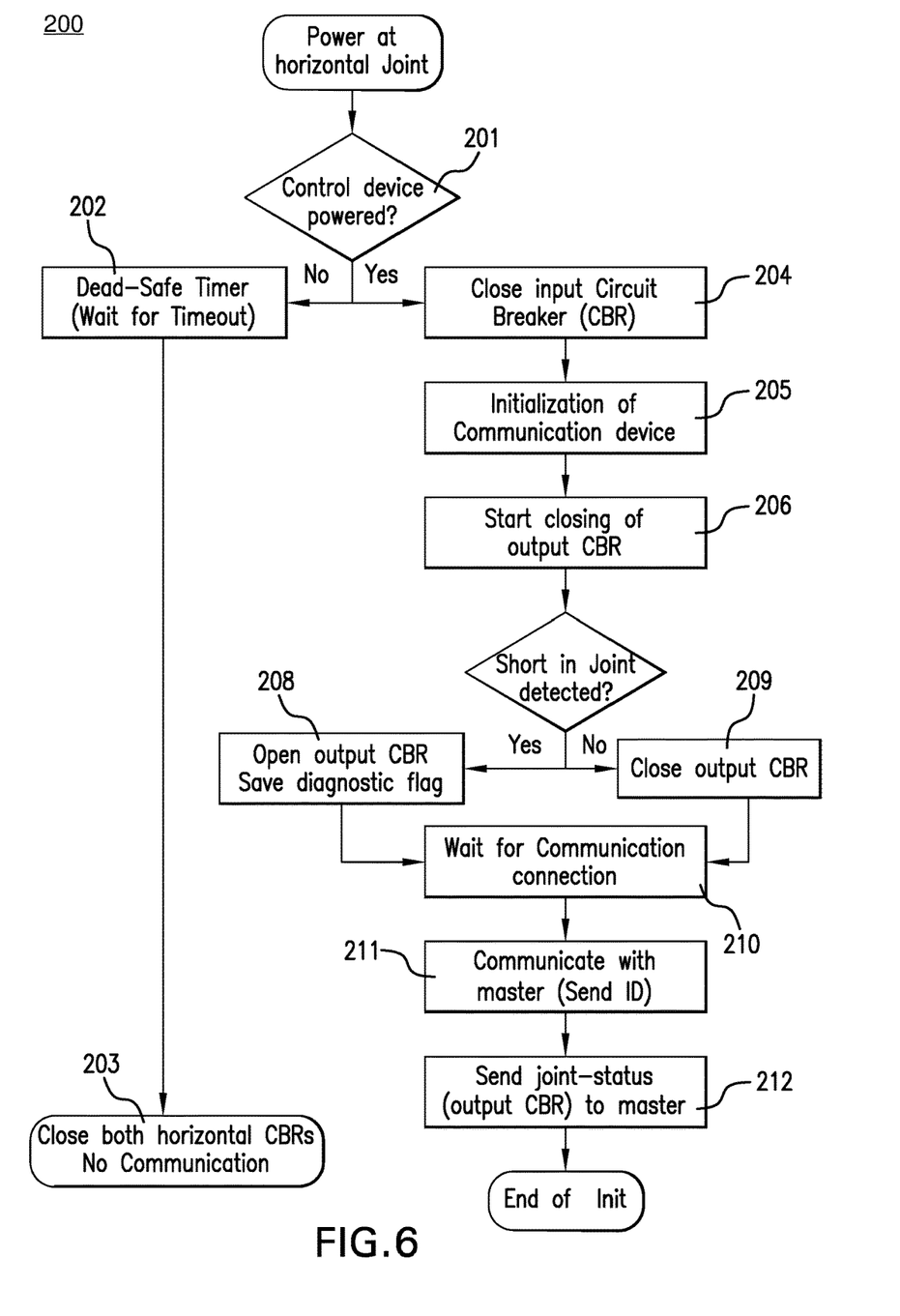
FIG. 6 is a flow chart depicting an embodiment of a method of initializing one or more downhole tools.

FIG. 6 is a flow chart showing a method 200 performed by a power control device during the initialization phase. In this embodiment, the power control device performs some functions autonomously and performs other functions in response to commands by the master. The power control device is in a slave-mode, i.e., the power control device is not the master, and in some cases will be one of a plurality of power control devices that receive communications and commands from the master. It is noted that, although a power control device is in slave mode, it retains the ability to autonomously monitor electrical connections and control power to the tool and/or other conductor segments.

The method 200 is described in conjunction with one or more of the power control devices shown in FIG. 4, but is not so limited. The method 200 includes one or more stages 201-212. In one embodiment, the method 200 includes the execution of all of the stages 201-212 in the order described. However, certain stages may be omitted, stages may be added, or the order of the stages changed.

At stage 201, a power control device is powered by receiving power, e.g., through the diode in the input breaker. In one embodiment, the power control device and the breaker system is connected to an independent monitoring circuit such as a dead-safe timer, which closes both the input and output breakers if there is a failure in the power control unit. The dead-safe timer waits for a selected period of time (stage 202), and if the power control device does not activate, the dead-safe timer closes both the input and output breakers (stage 203).

At stage 204, if the power control device is properly activated, e.g., by receiving power via the input diode, the power control device measures the voltage at an input side of the tool, and if the voltage is as expected, the power control device closes the input breaker and turns off the dead-safe timer.

After waiting a selected period of time to allow for the communication device (e.g., a modem) to power up (stage 205), the power control device starts closing the output breaker and tests the connection to a subsequent tool and/or bus segment. If a short is detected, the output breaker is opened (stage 207) and a diagnostic flag or other indication is set to inform the master controller (stage 208).

At stage 209, if the connection is good, the output breaker is closed to connect the subsequent bus segment to the power source. If a power control device and tool are connected to the subsequent segment, that power control device will commence its own startup procedure.

The power control device then waits for communication to be established with the master controller (stage 210), and sends an identification message and status information regarding the output breaker to the master (stages 211 and 212).

In one embodiment, the power control system and individual power control devices are configured to perform power management operations. Each power control device provides three power-levels for each tool: Idle, Base, and High-power. The Idle-mode supports communication between a power control device and a master or other component (e.g., a surface processing unit or other remote device), but without activation of a tool or tools connected to the power control device. In the Idle-mode the tool CBR is open, reducing power consumption to a minimum value, i.e., only the power consumption required by the power control device (e.g., modem and breaker controller). The power control device goes into the Base-mode upon receiving a request or message requesting activation of the tool. For example, the master can cause the power control device to go into the Base-mode by sending a Base-power-level command to a power control device. The High-power mode is not affected by the circuit breaker, but is extra power granted to the tool electronics on request.

After successful power up, the borehole string is electrically connected, and all of the upstream and downstream breakers are closed; the power control units are online and accessible from the master (power management). By default, the power control devices are in idle-mode (the stub or tool CBRs are open). To start a service, the master sends a tool-power command. In the above example shown in FIG. 4, the master sends a command (e.g., a power up-command) to a tool such as Tool 2. In response, the power control device of Tool 2 closes CBR 7 and measures the current into the Load 1 (i.e., the tool electronics). If power control device detects any deviation from a selected normal current (or deviation from a selected range around the normal current), the power control device opens the tool breaker (CBR 7 for Tool 2) and sends a failure-message or other communication to the diagnostic master to inform the master that there is a problem.

The power management master calculates the bus power and can switch between Idle and Base mode depending on the needed service deliverables as well as the available power within the borehole string. If additional power is required and additional power sources are available (such as a secondary power supply connected to Tool 4), the master can send a power-on command to Tool 4 and the respective controller will close its tool breaker (CBR 9), connecting the secondary power supply to the bus.

With the power management features of the three way breaker in a power control device, each tool can be put into Idle mode. In this mode only the modem/breaker board will be accessible, while the tool electronics are powered down to save bus power. Higher power management levels are implemented in firmware to put the tools in different power modes (normal operation, high power). Overall, with these features the downhole tools can be operated in plug and play mode, allowing the borehole string to virtually be put together in any order without compromising service functionality. Connection or tool electronics failures are detected and isolated and thus the failed connection can quickly be localized for repair. With the power management functions, the bus power can either be split up in such a way that it powers a separate tool all the way up to the entire bus.

In one embodiment, the power control device is configured to perform monitoring method or procedures, which include monitoring electrical connections to its respective tool and/or to a bus or other power supply conductor, to protect the tool and isolate the tool and/or section of the borehole string as needed. For example, the power control device's monitoring functions include opening a tool breaker to isolate a tool in response to detection of various types of failure, malfunction or other problems. The power control device allows for coping with multiple types of failures and can allow the operator to continue drilling even if part of the borehole string is not operating as expected. Examples of failures include joint failures (e.g., short or open circuit), tool failures (e.g., short, open circuit or low current) and power control device failures (e.g., breaker or modem failure).

A first example is discussed for a failure in the electrical conductor connected to a power control device. An example of a conductor is shown in FIG. 4, which is disposed along the borehole string. Segments of the conductors for each section of the string are connected at various tool joints or other connection points. The conductor in this example is a tool bus, but is not so limited.

In case of a conductor failure, such as a joint failure, in form of a short (e.g., a cable short, wet connector) the input and/or output CBR of an adjacent power control device is opened to protect the rest of the bus from voltage break down. The joint failure can either exist before power up or can occur during operation. If the failure is recognized during power up, the power control device detects voltage loss in the start-up phase and stops closing the respective breaker (i.e., the breaker closest to the failure).

If the failure does occur in operation with the bus powered, the power control device detects voltage loss and opens the respective breaker. In one embodiment, the master circuit breaker will trip due to overcurrent or undervoltage. After opening, the master may start a power cycle (e.g., by performing the initialization phase discussed above) to sequentially test the segments of the bus. This will make sure that the last CBR before the electrical short is opened and the rest of the borehole string is operating.

In case of an open connection (e.g., no tool attached, broken conductor cable) the last tool in the string closes the CBR to the open horizontal stub. No error is detected by the CBR controller as the open connection does not create a voltage drop. If the string is in initialization phase, the master will try to contact the newly connected node. As there is no node available due to the open connection, the physical setup is finalized at the last tool recognized. The tools behind the failed joint are excluded from the logical order or setup (compared to expected list from surface pre-configuration).

In the case of a tool electronic short or failure, the power consumption of the tool will heavily increase. The increased current in the stub 48 is recognized by the circuit breaker controller, which opens its tool breaker to protect the bus. The power control device sends an error message to the diagnostic master. Lowered power consumption (current) can be used for the diagnostic system, to identify failing electronics. In this case the master can decide to power cycle the respective tool in order to restart the electronics. If power cycling does not improve the situation, the failed tool/electronic may be marked as a defect for exchange at the surface.

If the power control device (e.g., the modem and/or circuit breaker controller) fails, control of the bus is at risk, as the breaker controller and communication unit are used for physical position detection and power management, as well as creating overall connectivity on the bus. If only the modem fails, the autonomous behavior of the breaker controller will still close the input and output breakers. The power control device will be unable to communicate with the master or power the tool electronics, but tools following this tool do get powered and can start their service as expected.

If the local controller fails, no communication with the master and no local breaker control by the controller are possible. To cope with this failure mode, an independent monitoring circuit (e.g., a dead-safe timer) can check for incoming power and start a timer if the bus voltage is reached. After a given time frame (e.g. 10 seconds) the monitoring circuit will close both the input and output breakers. This circuit is independent of the power control device and makes sure that the bus is not disconnected due to failing primary control electronics. After power-up the circuit breaker controller can disable the timer circuit to stop the CBRs from automatic closing.

In either failure case (communication unit or breaker controller failure), the master recognizes the missing tool in the logical BHA setup. The affected tool may be excluded from the logical list of tools, but the physical existence of a dead tool (communication wise) is known due to the time delay caused by the dead-safe timer.

In one embodiment, the system and/or power control device(s) are configured to receive power from multiple power sources. For example, as shown in FIG. 4, the system can switch from a primary power source connected to the master (Tool 1) to a secondary power source connected to Tool 4. The secondary power source may be a surface or downhole source, and may be any suitable type of source such as a motor, a remote source or a battery.

In one example, a Smart Battery System (SBS) is used as an alternative power source during flow off. It is used for applications like clock-heating (seismic) or flow-off pressure and directional measurements. The SBS may be activated by one or more power control devices, e.g., in response to a command from the master or other master controller.

The SBS or other secondary power source can operate in different modes, for example, as a backup-power supply (e.g., to be used if the primary power source fails or if a connection to the primary power source fails. For example, if a SBS is added to the borehole string, it acts as a secondary power supply with special features. The following use cases are discussed based on the borehole string example of FIG. 4, where the SBS is in place of the secondary power supply (Tool 4), but are not limited to that configuration model used above.

A first operation mode is an uninterrupted power supply (UPS) mode. In this mode, the CBR 9 of tool 4 is closed to attach the SBS electronics to the bus. The SBS electronic monitors the bus voltage and jumps in to support the bus voltage in case of power down detection (bus voltage drop). It is important for the battery to support the bus voltage before the voltage drops below the horizontal CBR voltage trip-level at the power management controller is reached. Otherwise, the bus is disconnected and the SBS would need to reestablish the connection.

In a second mode (a logging mode), the SBS receives a command from the master to start the logging mode after power down of the primary power supply. After flow off (power down) of the primary supply, the SBS takes over the bus power supply by powering the Modem/CBR via CBR 9's body diode. The bus is then powered from Tool 4, and Tool 4 becomes the master. As the power control devices of each connected tool are operating autonomously they start the power up procedure as described. During this procedure, the bus is powered up and the master starts operating (including communicating with the SBS to check for all required tools to be available after receiving the physical tool list from the SBS).

The master may be connected to a local or internal power supply or a remote or external power supply. For example, the master is connected to an external power supply such as an external power and communication box, which can be connected to the borehole string to program and verify the BHA at the surface. The BHA can also get powered externally (from the top end) for purposes such as a Rig Hang Test used to perform a final test of the string and the tools and perform configuration before deployment. In these cases the power and communication is connected via a dump-port to the bus.

If the Surface Box or Power Supply is attached to the Master's dump-port, the master can operate as if it was powered by its own generator and will initialize the BHA with the regular start up sequence. If the Surface Box is connected to a dump port located outside of the master-tool, the following procedure and limitations may be considered:

When power is applied, the tools will act as if they start in initialization mode. Each tool's input and output breaker will close (starting from the dump port) until the bus is completely connected and powered.

The powered tool will operate in a CBR-master mode to identify the borehole string setup and create a local list of the logical tools connected to the bus. It can send the physical setup to the local bus master after initialization.

The master detects the situation because external power is applied to its breakers and switches to a slave mode.

If there is no external surface box, but only a power supply available, the power control system's ability to detect the physical order of the tools depends on the power input point. If the BHA is powered via a dump port, the detection is operating as described above, where the powered tool acts as a breaker coordinator. But if power is applied from one end of the string, the master can identify the attached tools and do the logical addressing, but skips the physical position detection.

Within the borehole string, there are not only active components such as the master, measurement tools and logging tools, but there may also be passive components such as stabilizers. These components will not get equipped with full-blown power control devices (which include communication devices such as modems and breaker controllers), but their position within the borehole string should also be tracked and compared to the planned setup in pre-configuration phase at surface. To allow identification of passive tools (usually only equipped with a single wire for electrical connection of the BHA) these tools will get equipped with a simplified modem-board or other communication device, that does not have any breaker-capabilities but can communicate with the master (e.g., via PLC protocol) to identify itself. With this technology the master will detect all passive tools, attached to a newly connected part of the string.

The above disclosed embodiments provide several advantages. Embodiments described herein provide an efficient and effective system for managing power supply to tools or components in a borehole. For example, the introduction of a plug and play bus architecture with diagnostic capabilities poses significant benefits with respect to tool operation, such as illumination of complex tool programming, self-identification of tools, automatic determination of physical order of subs/services, and isolation of faulty components in string without compromising overall functionality of the string or BHA. Such advantages can result in a reduction of training needs, reduced time on rig and reduction of transactional errors Additional advantages include the ability to perform simple swapping of backup subs or alternate services, simple and quick identification of failed components, a reduction of the time needed for reliability assessment, the ability to run multiple instances of a service in the same string without additional effort, and provision of separate power management options for each service.

Embodiment 1

A power control device for controlling power supply to a downhole component, the device comprising: a communication device configured to be disposed in a borehole in an earth formation and configured to couple electrical power from a power source to a downhole component from a conductor disposed along a borehole string, a circuit breaker system including a first circuit breaker disposed at a connection between the conductor and the downhole component and configured to be closed to connect the downhole component to the conductor; and a controller configured to be disposed in the borehole, the controller configured to monitor at least one of a current level and a voltage level at the connection, the controller configured to control the circuit breaker system and autonomously perform: opening the first circuit breaker in response to detecting a deviation in the at least one of the current levels and voltage levels at the connection, to isolate the downhole component from the conductor and the power source.

Embodiment 2

The device of any prior embodiment, wherein the controller is configured to monitor a plurality of downhole components and the circuit breaker system includes a plurality of circuit breakers, each of the plurality of circuit breakers connected to the controller and to a respective downhole component, the controller configured to control each of the plurality of circuit breakers to individually connect or disconnect each of the plurality of downhole components.

Embodiment 3

The device of any prior embodiment, wherein the circuit breaker system includes a second circuit breaker, the second circuit breaker configured as an output circuit breaker disposed at the conductor and configured to be closed to connect a subsequent conductor to the power source, and the controller is further configured to perform: opening the second circuit breaker in response to detecting a deviation in at least one of a current level and a voltage level at the subsequent conductor, to isolate the subsequent conductor from the power source.

Embodiment 4

The device of any prior embodiment, wherein the circuit breaker system includes a third circuit breaker disposed at the conductor.

Embodiment 5

The device of any prior embodiment, wherein the third circuit breaker is an input circuit breaker disposed at a first location on the conductor between the power source and a connection point where the power control device is connected to the conductor, and the second circuit breaker is an output circuit breaker disposed at a second location on the conductor, the second location being on an opposite side of the connection point relative to the first location.

Embodiment 6

The device of any prior embodiment, wherein the controller is configured to autonomously open the first circuit breaker in response to detecting a failure in downhole component electronics.

Embodiment 7

The device of any prior embodiment, wherein the controller is configured to autonomously open the first circuit breaker in response to detecting a failure in downhole component electronics, and autonomously open the second circuit breaker in response to detecting a failure in the subsequent conductor.

Embodiment 8

The device of any prior embodiment, wherein the power control device is connected to a master controller, the master controller configured to communicate with the power control device and send messages to the power control device to connect or disconnect the downhole component via the first circuit breaker or to connect or disconnect the subsequent conductor via the second circuit breaker.

Embodiment 9

The device of any prior embodiment, wherein the power control device is configured to communicate with the master controller after the second circuit breaker is closed and the power control device is powered up, identify the downhole component and allow the master controller to determine an order of the downhole component relative to previously connected downhole components in the borehole string.

Embodiment 10

The device of any prior embodiment, wherein the master controller is configured to determine an order of the downhole component relative to previously connected downhole components in the borehole string based on a comparison of at least one of a measured input or output current to a known current consumption of at least one of the downhole component and the power control device.

Embodiment 11

The device any prior embodiment, wherein the power control device is configured to measure at least one of an input and an output current and add a pre-defined load to the conductor in response to the master controller issuing a command to increase power consumption, and the master controller is configured to receive a message from the power control device and determine an order of the downhole component relative to other downhole components based on the message.

Embodiment 12

The device of any prior embodiment, wherein the third circuit breaker includes a circuit component configured to transmit electrical power sufficient to activate the power control unit when the third circuit breaker is open.

Embodiment 13

The device of any prior embodiment, wherein the controller is configured to measure a voltage level at the conductor upon activation of the power control device, and close the third circuit breaker in response to the voltage level being within a selected range of a pre-configured voltage value.

Embodiment 14

A method of controlling power supply to a downhole component, the method comprising: disposing a power control device in a borehole in an earth formation, the power control device including a communication device configured to couple electrical power to a downhole component from a conductor disposed along a borehole string and connected to a power source, the power control device including a circuit breaker system and a controller configured to control the circuit breaker system, the circuit breaker system including a first circuit breaker disposed at a connection between the conductor and the downhole component and configured to be closed to connect the downhole component to the conductor; receiving electrical power via the conductor to activate the communication device and the controller; monitoring, by the power control device, at least one of a current level and a voltage level at the connection; and opening the first circuit breaker in response to detecting a deviation in the at least one of the current levels and voltage levels at the connection, to isolate the downhole component from the conductor and the power source.

Embodiment 15

The method of any prior embodiment, wherein the controller is configured to monitor a plurality of downhole components and the circuit breaker system includes a plurality of circuit breakers, each of the plurality of circuit breakers connected to the controller and to a respective downhole component, the controller configured to control each of the plurality of circuit breakers to individually connect or disconnect each of the plurality of downhole components.

Embodiment 16

The method of any prior embodiment, wherein the circuit breaker system includes a second circuit breaker, the second circuit breaker configured as an output circuit breaker disposed at the conductor and configured to be closed to connect a subsequent conductor to the power source, the method further comprising opening the second circuit breaker in response to detecting a deviation in at least one of a current level and a voltage level at the subsequent conductor, to isolate the subsequent conductor from the power source.

Embodiment 17

The method of any prior embodiment, wherein the circuit breaker system includes a third circuit breaker disposed at the conductor, the third circuit breaker configured as an input circuit breaker disposed at a first location on the conductor between the power source and a connection point where the power control device is connected to the conductor, and the second circuit breaker is an output circuit breaker disposed at a second location on the conductor, the second location being on an opposite side of the connection point relative to the first location.

Embodiment 18

The method of any prior embodiment, wherein opening the first circuit breaker is performed in response to detecting a failure in downhole component electronics, and opening the second circuit breaker is performed in response to detecting a failure in the subsequent conductor.

Embodiment 19

The method of any prior embodiment, wherein the power control device is connected by the conductor to a master controller, the master controller configured to communicate with the power control device and send messages to the power control device to connect or disconnect the downhole component via the first circuit breaker or to connect or disconnect the subsequent conductor via the second circuit breaker.

Embodiment 20

The method of any prior embodiment, further comprising transmitting a message by the power control device to the master controller, the message identifying the downhole component and allowing the master controller to identify an order of the downhole component relative to other downhole components in the borehole string.

In support of the teachings herein, various analysis components may be used, including a digital and/or an analog system. For example, embodiments such as the system 10, downhole tools, hosts and network devices described herein may include digital and/or analog systems. Embodiments may have components such as a processor, storage media, memory, input, output, wired communications link, user interfaces, software programs, signal processors (digital or analog), signal amplifiers, signal attenuators, signal converters and other such components (such as resistors, capacitors, inductors and others) to provide for operation and analyses of the apparatus and methods disclosed herein in any of several manners well-appreciated in the art. It is considered that these teachings may be implemented in conjunction with a set of computer executable instructions stored on a non-transitory computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms. The terms "first," "second" and the like do not denote a particular order, but are used to distinguish different elements.

While one or more embodiments have been shown and described, modifications and substitutions may be made thereto without departing from the spirit and scope of the invention. Accordingly, it is to be understood that the present invention has been described by way of illustrations and not limitation.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A power control device for controlling power supply to a first downhole component, the device comprising:
   a circuit breaker system including a first circuit breaker disposed between a conductor and the first downhole component, the conductor disposed along a borehole string and configured to connect the first downhole component to a first power source, the circuit breaker system including a second circuit breaker, the first circuit breaker configured to be closed to connect the first downhole component to the conductor; and
   a controller configured to monitor at least one of a current level and a voltage level, the controller configured to control the first circuit breaker and the second circuit breaker, and perform:
   opening at least one of the first circuit breaker and the second circuit breaker in response to detecting a deviation in the at least one of the current level and the voltage level.

2. The device of claim 1, wherein the controller is configured to communicate with a control unit, the control unit connected to a second power control device for controlling power supply to a second downhole component, the control unit configured to send a command to the power control device and the second power control device individually connect or disconnect the first downhole component and the second downhole component.

3. The device of claim 1, wherein the second circuit breaker is configured to be closed to connect a subsequent conductor to the first power source, and the circuit breaker system includes a third circuit breaker disposed between the first power source and the first downhole component, and the controller is configured to control the third circuit breaker.

4. The device of claim 3, wherein the circuit breaker system is configured to be operated by receiving power from an uphole location and from a downhole location relative to the first downhole component.

5. The device of claim 3, wherein the controller is configured to connect a second power source to the first downhole component to supply power to the first downhole component.

6. The device of claim 5, wherein the second power source includes electronics configured to receive a command or to monitor a voltage, and supply power to the first downhole component in response to receiving the command or monitoring the voltage.

7. The device of claim 5, wherein at least one of the first power source and the second power source includes a battery.

8. The device of claim 3, wherein the controller is configured to open the first circuit breaker in response to detecting a failure in the first downhole component, or open the second circuit breaker in response to detecting a failure in a downhole component connected to the subsequent conductor.

9. The device of claim 3, wherein the power control device is connected to a master controller, the master controller configured to communicate with the power control device and send messages to the power control device to open or close at least one of the first circuit breaker, the second circuit breaker, and the third circuit breaker.

10. The device of claim 9, wherein the power control device is configured to transmit a message to the master controller, the message identifying the first downhole component and allowing the master controller to identify an order of the first downhole component relative to other downhole components to the borehole string.

11. The device of claim 9, wherein the master controller is configured to determine an order of the first downhole component relative to other connected downhole components in the borehole string.

12. The device of claim 3, further comprising a circuit component configured to transmit electrical power sufficient to activate the controller when at least one of the second circuit breaker and the third circuit breaker is open.

13. The device of claim 12, wherein the circuit component includes a first diode configured to bypass at least one of the second circuit breaker and the third circuit breaker.

14. The device of claim 13, wherein the controller is configured to measure the voltage level, and close at least one of the first circuit breaker, the second circuit breaker and the third circuit breaker in response to the voltage level being within a selected range.

15. The device of claim 13, further comprising a second diode configured to bypass an other of the at least one of the second circuit breaker and the third circuit breaker.

16. The device of claim 15, wherein the first diode is configured to bypass the third circuit breaker when the circuit breaker system receives power from an uphole location and the second diode is configured to bypass the second circuit breaker when the circuit breaker system receives power from a downhole location.

17. A method of controlling power supply to a first downhole component, the method comprising:

disposing a first power control device in a borehole in an earth formation, the first power control device configured to couple electrical power to the first downhole component from a conductor disposed along a borehole string and connected to a first power source, the first power control device including a circuit breaker system and a controller, the circuit breaker system including a first circuit breaker disposed between the conductor and the first downhole component and configured to be closed to connect the first downhole component to the conductor, the circuit breaker system including a second circuit breaker;

receiving electrical power via the conductor to activate the controller;

monitoring, by the first power control device, at least one of a current level and a voltage level; and opening at least one of the first circuit breaker and the second circuit breaker in response to detecting a deviation in the at least one of the current level and the voltage level.

18. The method of claim 17, wherein the controller is configured to communicate with a control unit, the control unit connected to a second power control device for controlling power supply to a second downhole component, the control unit configured to send a command to the first power control device and the second power control device to individually connect or disconnect the first downhole component and the second downhole component.

19. The method of claim 17, wherein the second circuit breaker is configured to be closed to connect a subsequent conductor to the first power source, and the circuit breaker system includes a third circuit breaker disposed between the first power source and the first downhole component, and the controller is configured to control the third circuit breaker.

20. The method of claim 19, wherein the circuit breaker system is configured to be operated by receiving power from an uphole location and from a downhole location relative to the first downhole component.

21. The method of claim 19, wherein the controller is configured to connect a second power source to the first downhole component to supply power to the first downhole component, the second power source includes electronics configured to receive a command or to monitor a voltage, and the method further comprises supplying power to the first downhole component in response to receiving the command or monitoring the voltage.

22. The method of claim 20, wherein at least one of the first power source and the second power source includes a battery.

23. The method of claim 19, wherein the first power control device is connected by the conductor to a master controller, the master controller configured to communicate with the first power control device and send messages to the first power control device to open or close at least one of the first circuit breaker, the second circuit breaker, and the third circuit breaker.

24. The device of claim 23, further comprising transmitting a message by the first power control device to the master controller, the message identifying the first downhole component and allowing the master controller to identify an order of the first downhole component relative to other downhole components in the borehole string.

25. The method of claim 19, wherein the first power control device includes a circuit component configured to transmit electrical power sufficient to activate the controller when at least one of the second and the third circuit breaker is open.

26. The method of claim 25, wherein the circuit component includes a diode configured to bypass at least one of the second circuit breaker and the third circuit breaker.

27. The method of claim 26, wherein the diode includes a first diode and a second diode, the first diode is configured to bypass the third circuit breaker when the circuit breaker system receives power from an uphole location and the second diode is configured to bypass the second circuit breaker when the circuit breaker system receives power from a downhole location.

28. The method of claim 19, wherein the controller is configured to open the first circuit breaker in response to detecting a failure in the first downhole component, or open the second circuit breaker in response to detecting a failure in a downhole component connected to the subsequent conductor.

29. The method of claim 22, wherein the controller is configured to measure the voltage level, and close at least one of the first circuit breaker, the second circuit breaker and the third circuit breaker in response to the voltage level being within a selected range.

30. The method of claim 21, wherein the first power control device is connected to a master controller, and the master controller is configured to determine a physical order of the first downhole component relative to a second downhole component along the borehole string.

* * * * *